United States Patent
Gass et al.

(10) Patent No.: US 10,442,106 B2
(45) Date of Patent: Oct. 15, 2019

(54) EXTENSION RAILS FOR TABLE SAWS (71) Applicants: Stephen F. Gass, West Linn, OR (US);
Steven D. McDaniel, Burton, OH (US);
David A. Fanning, Vancouver, WA (US)

(72) Inventors: Stephen F. Gass, West Linn, OR (US);
Steven D. McDaniel, Burton, OH (US);
David A. Fanning, Vancouver, WA (US)

(73) Assignee: SawStop Holding LLC, Tualatin, OR (US)

( * ) Notice: Subject to any disclaimer, the term of this patent is extended or adjusted under 35 U.S.C. 154(b) by 90 days.

(21) Appl. No.: 14/674,875

(22) Filed: Mar. 31, 2015

(65) Prior Publication Data

US 2015/0273723 A1    Oct. 1, 2015

Related U.S. Application Data (60) Provisional application No. 61/973,044, filed on Mar. 31, 2014.

(51) Int. Cl.
| | |
|---|---|
| *B26D 1/18* | (2006.01) |
| *B27B 27/04* | (2006.01) |
| *B27B 3/28* | (2006.01) |
| *B27B 27/10* | (2006.01) |
| *B27B 27/02* | (2006.01) |
| *B23D 47/02* | (2006.01) |

(52) U.S. Cl.
CPC ............ *B27B 27/10* (2013.01); *B23D 47/025* (2013.01); *B27B 27/02* (2013.01); *Y10T 83/727* (2015.04)

(58) Field of Classification Search
CPC ... Y10T 83/727; Y10T 403/55; Y10T 403/60; Y10T 403/602; Y10T 403/606; Y10T 403/599; B23D 47/025; B27B 27/02; B27B 27/10
USPC .............. 83/543, 745, 829, 574, 441.1, 438; 403/321, 325, 322.1, 397, 330, 322.4, 403/326–327, 83–84; 238/10 E, 10 F, 238/10 B, 10 R; 24/613–615, 573.09
See application file for complete search history.

(56) References Cited

U.S. PATENT DOCUMENTS

| | | | | |
|---|---|---|---|---|
| 1,048,596 A | * | 12/1912 | Sedaj | ........................ A47B 1/04 108/69 |
| 1,489,239 A | * | 4/1924 | Eagan | ........................ G01B 3/06 33/343 |
| 1,938,548 A | | 12/1933 | Tautz | |

(Continued)

OTHER PUBLICATIONS

The INCA Woodworking Machinery Handbook—With Useful Tips and Jigs for Everyone, INCA Maschinen, 1984.

(Continued)

*Primary Examiner* — Ghassem Alie
*Assistant Examiner* — Bharat C Patel (57) ABSTRACT

Extension rails for table saws are disclosed. Some of the disclosed extension rails can be attached to a table saw without a user having to manipulate a lever or knob. Extension rails particularly relevant to portable table saws such as jobsite and bench-top table saws are disclosed, including extension rails that can provide 48" or more of cutting capacity on jobsite and/or bench-top table saws. A method of attaching extension rails to a table saw is disclosed that does not require the use of a tool or the manipulation of a knob or clamp.

4 Claims, 7 Drawing Sheets

(56) References Cited

U.S. PATENT DOCUMENTS

| | | | |
|---|---|---|---|
| 1,963,688 A | 6/1934 | Tautz | |
| 1,993,219 A | 3/1935 | Merrigan | |
| 2,075,282 A | 3/1937 | Hedgpeth | |
| 2,106,288 A | 1/1938 | Tautz | |
| 2,555,217 A * | 5/1951 | Young | B23D 47/025 144/286.1 |
| 2,556,548 A | 6/1951 | Modderman | |
| 2,590,035 A | 3/1952 | Pollak | |
| 2,622,637 A | 12/1952 | Gustin | |
| 2,646,633 A * | 7/1953 | Jahn | E02F 3/7659 172/782 |
| 2,695,638 A | 11/1954 | Gaskell | |
| 2,829,018 A * | 4/1958 | Valtri | A47B 1/10 52/582.2 |
| 2,852,047 A | 9/1958 | Odlum et al. | |
| 2,945,516 A | 7/1960 | Edgemond, Jr. et al. | |
| 3,001,215 A * | 9/1961 | Holley | A43D 3/023 12/136 R |
| 3,011,531 A | 12/1961 | Gaskell | |
| 3,021,881 A | 2/1962 | Edgemond, Jr. et al. | |
| 3,565,137 A | 2/1971 | Alsruhe | |
| 3,695,189 A * | 10/1972 | Felder, Jr. | A47B 1/00 108/65 |
| 3,845,676 A | 11/1974 | Pierce | |
| 3,928,950 A * | 12/1975 | Beynon | E04B 9/10 403/393 |
| 3,953,770 A | 4/1976 | Hayashi | |
| 4,068,551 A * | 1/1978 | Kreitz | B23D 47/025 108/48 |
| 4,106,381 A * | 8/1978 | Kreitz | B23D 47/025 83/477.2 |
| 4,171,013 A * | 10/1979 | Clark | B60P 3/343 135/140 |
| 4,179,066 A * | 12/1979 | Teter | A63H 19/30 238/10 E |
| 4,185,409 A * | 1/1980 | Cheng | A63H 18/028 104/79 |
| 4,206,910 A | 6/1980 | Biesemeyer | |
| 4,248,115 A * | 2/1981 | Brodbeck | B23D 47/025 144/286.1 |
| 4,294,147 A | 10/1981 | Borzym | |
| 4,413,366 A * | 11/1983 | Whitehead | A47C 19/005 403/254 |
| 4,452,117 A * | 6/1984 | Brickner | B23D 45/024 83/468 |
| 4,566,510 A | 1/1986 | Bartlett et al. | |
| 4,677,920 A * | 7/1987 | Eccardt | B23D 47/025 108/152 |
| 4,733,704 A * | 3/1988 | Wolff | B23D 47/025 108/159 |
| 4,848,203 A | 7/1989 | Brooks | B26D 7/01 144/253.1 |
| 4,898,326 A * | 2/1990 | Edwards | A63H 19/30 238/10 E |
| 4,934,423 A * | 6/1990 | Withrow | B23D 47/025 144/286.1 |
| 4,955,941 A * | 9/1990 | Rousseau | B23D 47/025 108/65 |
| 4,964,450 A | 10/1990 | Hughes et al. | |
| 5,116,249 A | 5/1992 | Shiotani et al. | |
| 5,127,131 A * | 7/1992 | Corrigan | B64G 1/641 16/422 |
| 5,171,098 A * | 12/1992 | Jost | F16B 7/187 403/252 |
| 5,174,349 A | 12/1992 | Svetlik et al. | |
| 5,184,352 A * | 2/1993 | Maufette | A41F 9/002 24/579.09 |
| 5,230,269 A | 7/1993 | Shiotani et al. | |
| 5,293,802 A | 3/1994 | Shiontani et al. | |
| 5,363,893 A * | 11/1994 | Grochowicz | B23D 47/025 108/69 |
| 5,379,816 A * | 1/1995 | Charlton | B23D 47/025 108/69 |
| 5,442,984 A * | 8/1995 | Tate | B23D 45/027 144/287 |
| 5,464,184 A | 11/1995 | Folci | |
| 5,503,330 A * | 4/1996 | Riley | A63H 19/36 238/10 B |
| 5,647,258 A | 7/1997 | Brazell et al. | |
| 5,651,298 A * | 7/1997 | Break | B23D 47/025 83/471.3 |
| 5,687,649 A * | 11/1997 | Koeninger | E01B 25/24 104/106 |
| 5,722,308 A * | 3/1998 | Ceroll | B23Q 3/007 144/253.1 |
| 5,768,966 A * | 6/1998 | Duginske | B27B 25/10 144/253.1 |
| 5,803,650 A * | 9/1998 | Wu | A47D 13/063 403/102 |
| 5,857,507 A | 1/1999 | Puzio et al. | |
| 5,857,799 A * | 1/1999 | Blake, III | H02G 3/0418 174/95 |
| 5,924,827 A * | 7/1999 | Mora | B23Q 1/03 144/1.1 |
| 5,927,857 A | 7/1999 | Ceroll et al. | |
| 5,979,523 A | 11/1999 | Puzio et al. | |
| D422,290 S | 4/2000 | Welsh et al. | |
| 6,062,121 A | 5/2000 | Ceroll et al. | |
| 6,074,269 A * | 6/2000 | Rothbarth | A63F 7/3622 238/10 R |
| 6,131,629 A | 10/2000 | Puzio et al. | |
| 6,148,703 A | 11/2000 | Ceroll et al. | |
| 6,161,459 A | 12/2000 | Ceroll et al. | |
| 6,220,317 B1 * | 4/2001 | Martin | H02G 1/00 144/144.1 |
| 6,250,190 B1 | 6/2001 | Ceroll et al. | |
| 6,293,176 B1 * | 9/2001 | Talesky | B23D 47/025 144/286.1 |
| 6,357,328 B1 | 3/2002 | Ceroll et al. | |
| 6,439,280 B1 * | 8/2002 | Wang | B23D 47/025 108/64 |
| 6,446,413 B1 * | 9/2002 | Gruber | A47G 27/0237 52/127.7 |
| 6,450,077 B1 | 9/2002 | Ceroll et al. | |
| 6,460,442 B2 | 10/2002 | Talesky et al. | |
| 6,484,614 B1 * | 11/2002 | Huang | B23D 47/025 269/318 |
| 6,484,767 B2 | 11/2002 | Cameron | |
| 6,575,067 B2 | 6/2003 | Parks et al. | |
| 6,581,655 B2 * | 6/2003 | Huang | B23D 47/025 144/287 |
| 6,601,493 B1 | 8/2003 | Crofutt | |
| D479,538 S | 9/2003 | Welsh et al. | |
| 6,640,683 B2 | 11/2003 | Lee | |
| 6,644,157 B2 | 11/2003 | Huang | |
| 6,644,370 B2 * | 11/2003 | Aigner | B23D 47/025 108/65 |
| 6,647,847 B2 | 11/2003 | Hewitt et al. | |
| 6,705,192 B2 * | 3/2004 | Logan | B23D 47/025 144/286.5 |
| 6,736,042 B2 * | 5/2004 | Behne | B23D 45/068 83/440.2 |
| 6,854,371 B2 | 2/2005 | Yu | |
| 6,986,370 B1 | 1/2006 | Schoene et al. | |
| 7,036,414 B2 | 5/2006 | Behne et al. | |
| 7,043,795 B2 * | 5/2006 | Bosgoed | A47H 1/04 16/211 |
| 7,083,111 B2 * | 8/2006 | Reisher | A63H 18/08 104/60 |
| 7,086,205 B2 * | 8/2006 | Pervan | E04F 15/02 404/41 |
| 7,328,890 B2 * | 2/2008 | Kent | B25H 1/18 269/139 |
| 7,617,651 B2 * | 11/2009 | Grafenauer | E04F 15/02 52/592.1 |
| 8,453,900 B1 * | 6/2013 | Shirk | B27F 7/02 227/111 |
| 8,789,450 B2 * | 7/2014 | Scherl | B27B 27/02 83/446 |

(56) References Cited

U.S. PATENT DOCUMENTS

| | | | | |
|---|---|---|---|---|
| 8,863,902 B2* | 10/2014 | Lanzafame | ............... | E06C 1/34 |
| | | | | 182/129 |
| 8,967,607 B2* | 3/2015 | Ducek | ..................... | B25H 1/02 |
| | | | | 108/18 |
| 9,255,414 B2* | 2/2016 | Palsson | ................... | E04F 15/02 |
| 2002/0050201 A1 | 5/2002 | Lane et al. | | |
| 2005/0087049 A1 | 4/2005 | Miller | | |
| 2005/0217446 A1* | 10/2005 | Brazell | ............... | B23D 47/025 |
| | | | | 83/477.2 |
| 2006/0130623 A1 | 6/2006 | Ceroll et al. | | |
| 2007/0172311 A1* | 7/2007 | Sanz Gamboa | .......... | B66B 7/02 |
| | | | | 403/252 |
| 2008/0047411 A1* | 2/2008 | Cao | ....................... | B23D 47/02 |
| | | | | 83/829 |
| 2008/0236355 A1 | 10/2008 | Gass et al. | | |
| 2008/0283336 A1* | 11/2008 | Clear | ....................... | E04G 1/14 |
| | | | | 182/224 |
| 2009/0165624 A1* | 7/2009 | Brown | ................. | B23D 47/025 |
| | | | | 83/477 |
| 2009/0308218 A1* | 12/2009 | Raff | ..................... | B23Q 9/0042 |
| | | | | 83/745 |
| 2011/0017041 A1 | 1/2011 | Frolov | | |
| 2011/0061509 A1* | 3/2011 | Scherl | .................. | B23D 47/025 |
| | | | | 83/474 |
| 2012/0132049 A1* | 5/2012 | Bokelaar | .............. | B23D 47/025 |
| | | | | 83/574 |
| 2014/0360332 A1* | 12/2014 | Schambeck | ............. | B27B 21/00 |
| | | | | 83/471 |

OTHER PUBLICATIONS

SI16WA-WF Circular Saw with Tilting Blade Spare Parts Catalogue, SCMI Corporation, Norcross, GA, Nov. 1986 and 1991.
Inca 2100SE Professional Tablesaw Owners Manual, Injecta Machinery, 1992.
Skil Model 3400-Type 1 10 Table Saw Parts List and Technical Bulletin, S-B Power Tool Company, Jun. 1993.
*Building a Clone of a Biesemeyer Table Saw Fence*, Swensen, 1996, 2006.
Shop Fox® Fence Operating Manual, Woodstock International, Inc., 1996, revised May 1997.
Elmshorn Student Wins for the Seconds Time at Jugend Forscht, Hamburg Morning News, May 5, 1997.
Active Safety System on a Table Saw, Jan Nieberle & Sebastian Hauer, 1997 Workplace Bavaria.
SI320 Circular with Tilting Blade Spare Parts Catalogue, SCM, Dec. 23, 1998.
SI32000/3800 Circular with Tilting Blade Spare Parts Catalogue, SCM, Dec. 23, 1998.
Altendorf publication, Wilhelm Altendorf GmbH & Co. KG, Minden, Germany, 1999.
Grizzly Industrial, Inc. Heavy-Duty 12 Table Saw Model G5959 and G9957 Parts List, 1998 and Oct. 2001.
Excaliber T-Slot Precision Saw Fence Model TT45 Owner's Manual, Sommerville Design & Manufacturing, Inc., May 2000.
SI300N Circular with Tilting Blade Spare Parts Catalogue, SCM, Jun. 12, 2000.
Bosch Model 4000 Worksite Table Saw Operating/Safety Instructions, S-B Power Tool Company, Jul. 2000.
SI400N Circular with Tilting Blade Spare Parts Catalogue, SCM, Sep. 19, 2000.
DeWalt Woodworker's Table Saw DW746 Instruction Manual, DeWalt Industrial Tool Co., 2000.
SC 3W Circular Saw Manual, SCM Group S.p.A Divisione Minimax—Samco, Feb. 2001.
Ryobi 10" Table Saw BT3000 Operator's Manual, Ryobi Technologies, Inc., Mar. 2001.
XACTA Fence II™ Homeshop 30/52 Owner's Manual, JET Equipment & Tools, Mar. 2001.

XACTA Fence II™ Commercial 30/50 Owner's Manual, JET Equipment & Tools, Mar. 2001.
SI450E Circular with Tilting Blade Spare Parts Catalogue, SCM, Apr. 26, 2001.
Bosch 10" Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10" Tilting Arbor Saw Model 66 Instruction Manual & Parts List, JET Equipment & Tools, Jun. 2001.
Powermatic Accu-Fence for the Models 66, 72A & 74A Table Saws, Instruction Manual & Parts List, Jet Equipment & Tools, at least as early as 2002.
Skil Model 3400 Table Saw Operating/Safety Instructions, S-B Power Tool Co., Sep. 2001.
Ryobi 10" Table Saw BT3100 Operator's Manual, Ryobi Technologies, Inc., Aug. 2002.
Rojek KPF 300A-xxxx-RN-1P3 Table Saw/Shaper Combination Machine specification sheet, Sep. 30, 2002.
Laguna Tools Signature Series by Knapp, Oct. 21, 2002.
Rojek Circular Saw PK 300 Spare part catalogue, Apr. 14, 2003.
Ridgid TS3650 Operators Manual 10" Cast Iron Table Saw, May 2003, Jun. 2003 and Jul. 15, 2003.
Porter-Cable Double Insulated 10" Bench Top Table Saw Instruction Manual, Porter-Cable Corporation, Sep. 15, 2003.
SI300S-S1300S4 Circular with Tilting Blade Spare Parts Catalogue, SCM, Oct. 30, 2003.
INCRA Incremental Micro Precision Table Saw Fence Owner's Manual, Taylor Design Group, Inc., 2003.
Craftsman® Power and Hand Tools, pp. 142-143, 2003.
The Legendary Shopsmith Mark V ad, Shopsmith, Inc., at least as early as Jan. 14, 2004.
Shop Fox® Models W2005, W2006, W2007 Classic Fence Instruction Manual, Woodstock International, Jan. 2000, revised Mar. 2004.
ACCU-FENCE® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
Powermatic WMH Tool Group Operating Instructions and Parts Manual 10-inch Cabinet Saw Model 2000, Nov. 2005.
Makita Model 2704 Exploded Drawings and Parts List, Nov. 2005.
Porter-Cable 10" Portable Table Saw 3812, Porter-Cable Corporation, 2005.
Porter Cable 10" Portable Table Saw Model 3812 Parts List with Guard Exploded View, 2005.
DW745 Type 1 Table Saw Parts List, DeWalt Industrial Tool Co., 2005.
Grizzly Industrial, Inc. Model G0605X/G0606X Extreme Series 12" Table Saw Owner's Manual, Grizzly Industrial, Inc., Oct. 2006.
C10RB Jobsite Table Saw Manual, Hitachi Koki USA Ltd., 2006.
TS 250 Manual, Metabo, 2007.
TS 250 Circular Saw Parts List, Metabo, 2007.
Bosch 4100 Table Saw Parts List, Robert Bosch Tool Corporation, Feb. 14, 2008.
Grizzly Industrial, Inc. Model G0651/G0652 10" Extreme Series Table Saws Owner's Manual, Grizzly Industrial, Inc., Mar. 2008.
Bosch 4100 Table Saw Manual, Robert Bosch Tool Corporation, May 2008.
General Model 50-300/305 MI, 50-300CE/305CE Setup and Operation Manual, General International, Jul. 2009.
Table Saw Face-Off, Hurst-Wajszczuk, Woodcraft Magazine, Oct./Nov. 2009.
JET XACTA Saw Deluxe Operating Instructions and Parts Manual, JET/Walter Meier Manufacturing Inc., Dec. 2009.
Delta 10" Left Tilting Unisaw Instruction Manual, Delta Machinery, 2009, 2010.
General Model 502-70 Setup and Operation Manual, General International, Mar. 2010.
General Model 50-200R Setup and Operation Manual, General International, Sep. 2010.

(56) References Cited

OTHER PUBLICATIONS

Delta UNISAW Accessories, Delta Power Equipment Corporation, Mar. 1, 2012.
DeWALT Models DWE7490, DWE7491 Instruction Manual, DeWALT Industrial Tool Co., 2013.
SCM SI 450 Circular saw with tilting blade product brochure, Villa Verucchio, Italy, undated.
SCM Group publication, Rimini, Italy, undated.
Makita Table Saw 2704 Instruction Manual, Makita Corporation of America, date unknown.
Laguna Tools table saw owner's manual, date unknown.

* cited by examiner

EXTENSION RAILS FOR TABLE SAWS

CROSS-REFERENCE TO RELATED APPLICATION

This application claims the benefit of and priority from U.S. Provisional Patent Application Ser. No. 61/973,044, filed Mar. 31, 2014, which is incorporated herein by reference.

TECHNICAL FIELD

The present specification relates to table saws, and particularly, to extension rails for table saws.

BACKGROUND

A table saw is a power tool used to cut a work piece, such as a piece of wood, to a desired size or shape. A table saw includes a work surface or table and a circular blade extending up through the table. A person uses a table saw by placing a work piece on the table and feeding it into contact with the spinning blade to cut the work piece to a desired size.

The table saw is one of the most basic machines used in woodworking. For example, table saws are used to make furniture and cabinetry, to install hardwood flooring, to cut material for countertops, to cut plywood panels for roofing and walls, to make pallets and crates, and for many more projects and tasks.

Table saws come in various sizes ranging from large, stationary, industrial table saws, to small, lightweight, portable table saws. Larger table saws are sometimes called cabinet saws, mid-sized table saws are sometimes called contractor saws or hybrid saws, and smaller table saws are sometimes called portable, jobsite, or bench-top table saws. The larger table saws include induction motors and typically weigh well over 100 pounds. The smaller, portable table saws are typically small and light enough to be transported in the back of a pick-up truck, and they often have stands with wheels so they can be moved around a jobsite or workspace. The smaller table saws have universal motors and weigh less than 100 pounds. For example, jobsite saws weigh approximately 60 to 80 pounds, and the smallest bench-top saws weigh approximately 30 to 40 pounds.

This document describes extension tables and rails that can be used with all types of table saws. The extension tables and rails described herein may be particularly relevant to portable table saws such as jobsite table saws.

DETAILED DESCRIPTION

Figure 1:
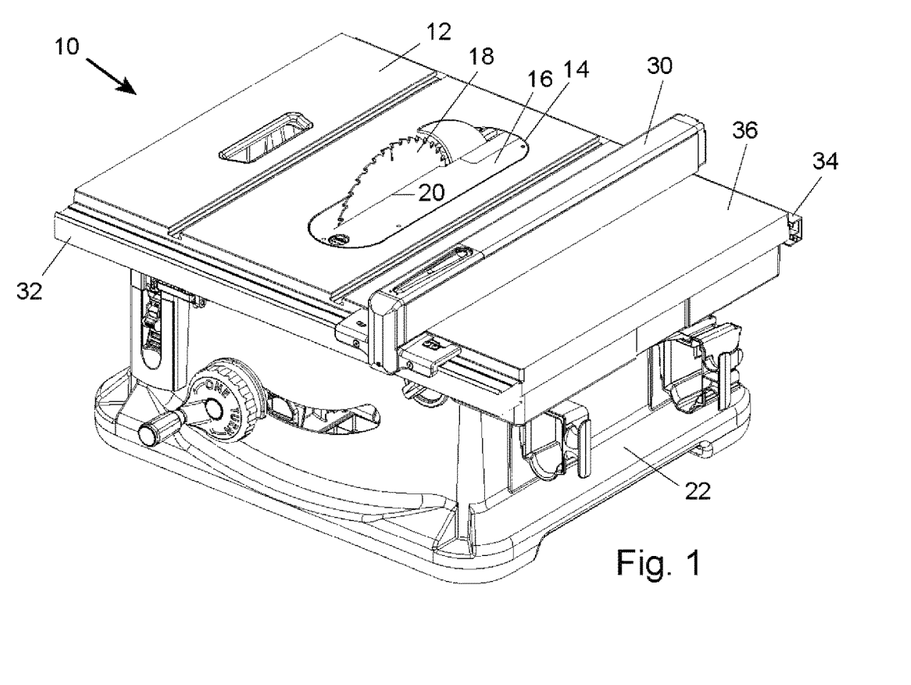
FIG. 1 shows a table saw.

FIG. 1 shows a table saw 10. The table saw includes a table 12 with an opening 14 and an insert 16 in the opening. A blade 18 extends up through a slot 20 in the insert. A housing 22 supports the table and a motor is within the housing. The motor is operably connected to the blade to drive or spin the blade. To use the table saw, a user places a work piece on the table and slides it into contact with the spinning blade to make a cut.

Typically a user of a table saw guides the work piece past the blade with a fence, such as fence 30 in FIG. 1. The fence mounts to the top of the table saw and provides a fixed reference surface relative to the blade. The user can slide the work piece against and along the fence to make a cut. The fence helps keep the work piece moving in a straight path without shifting or rotating, and therefore, helps produce a straight cut. The fence can be positioned at various positions relative to the blade so that a work piece can be cut to different dimensions.

The fence typically clamps to a rail running along the front edge of the table saw, such as front rail 32 in FIG. 1, and the fence can be locked or clamped anywhere along the rail. The fence may also rest on or clamp to a rail running along the rear of a table saw, such as rear rail 34 in FIG. 1. Various fences are described in U.S. Provisional Patent Application Ser. No. 61/892,237, titled "Fences for Table Saws," filed Oct. 17, 2013, which is incorporated herein by reference.

The length of the rail along the front of the saw determines how far the fence can be positioned from the blade, and therefore, the largest dimension that can be cut on the saw using the fence. This may be called the cutting capacity or rip capacity of the saw. Some table saws include rails sufficiently long to provide 36 inches of cutting capacity—in other words, the face of the fence nearest the blade can be positioned 36 inches away from the blade so a work piece can be cut to 36 inches wide, and the front and rear rails are long enough to support the fence in that position. Other table saws include rails with 52 inches of cutting capacity. Saws with these cutting capacities are typically stationary saws called cabinet saws or contractor saws. Smaller, portable table saws, such as jobsite or bench-top saws, typically provide anywhere from 18 inches to about 30 inches of cutting capacity.

Figure 2:
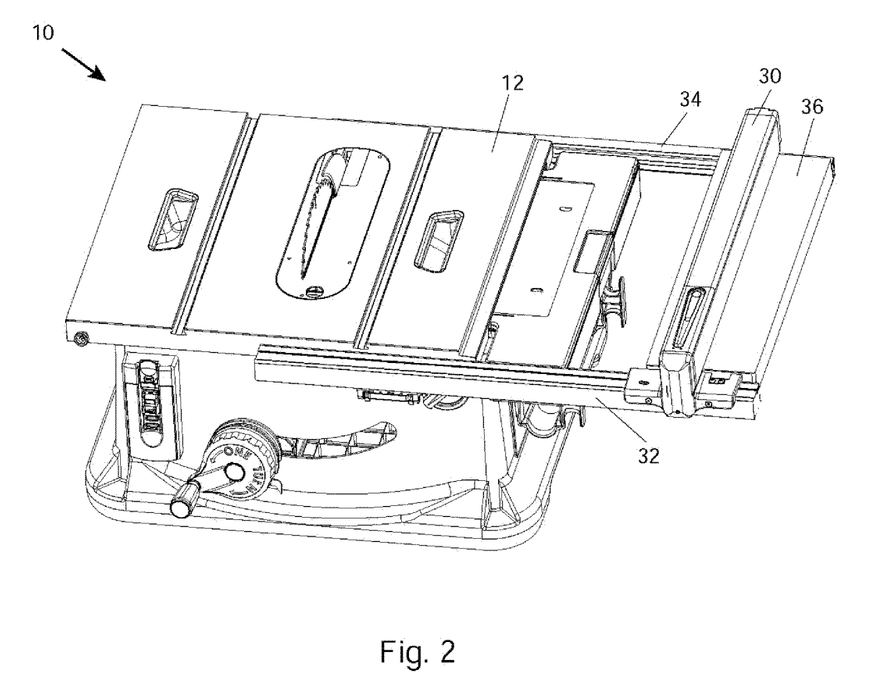
FIG. 2 shows a table saw with rails extended.

In smaller, portable table saws, the rails may move or telescope out to provide increased cutting capacity. In table saw 10, front rail 32 and rear rail 34 are attached to table 12 in such a way that they can move to the right to provide increased cutting capacity. FIG. 2 shows table saw 10 with front rail 32 and a rear rail 34 moved or extended to the right side. An extension table 36 extends between the right, distal ends of the front and rear rails and is connected to both rails. The extension table provides an additional support surface for work pieces, especially when the rails are extended. Extension table 36 can be connected to the front and rear rails in many ways, for example, by screws which thread into sockets on the front and rear rails, or by screws which thread into clamping plates that clamp against surfaces on the front and rear rails when the screws are tightened. In FIG. 2, fence 30 is positioned over extension table 36.

Figure 3:
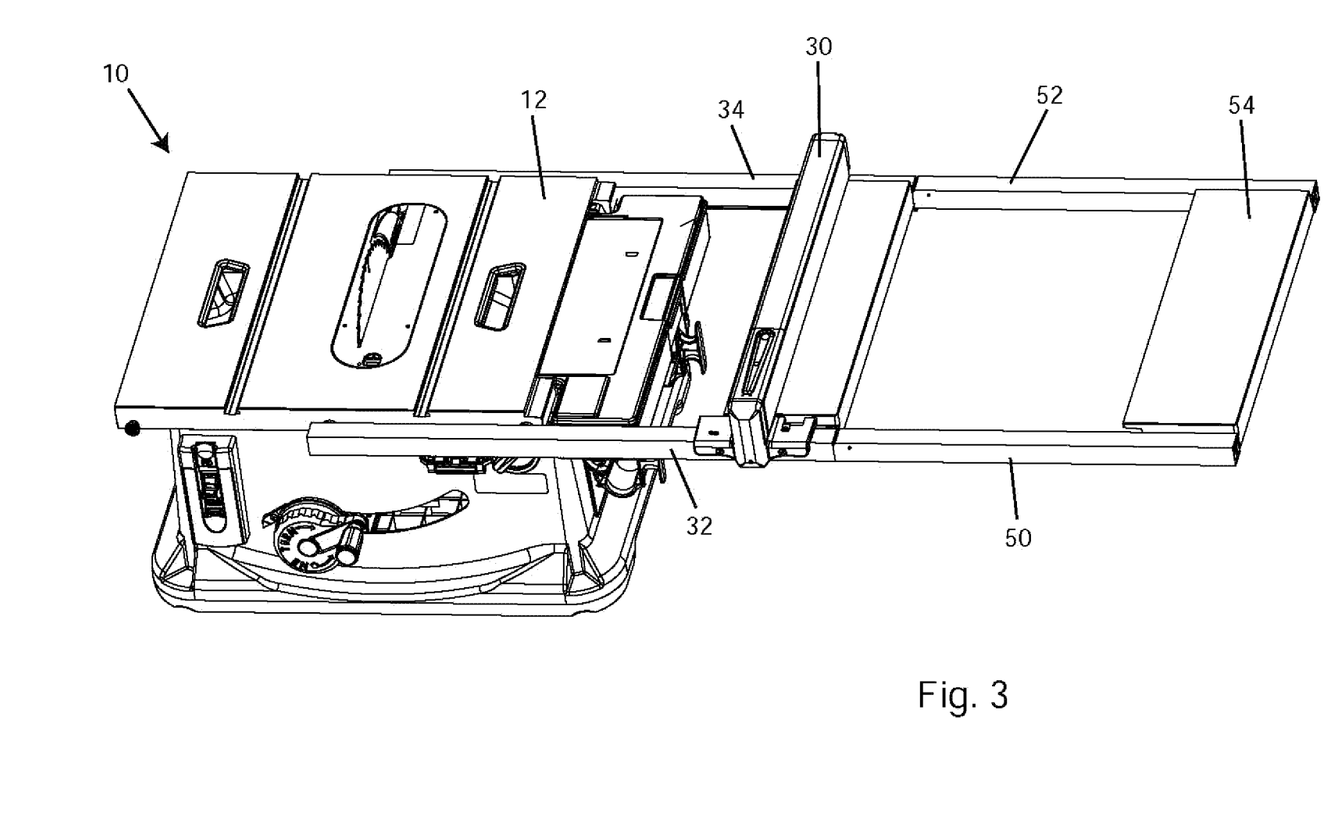
FIG. 3 shows a table saw with extension rails.

In smaller, portable table saws, the rails are typically sized so that they do not extend substantially beyond the perimeter of the table when the rails are retracted. This minimizes the size and weight of the saw and helps maximize the saw's portability, but limits the saw's cutting capacity when using the fence. To increase the cutting capacity, so that a user can cut a large sheet of plywood, for example, extension rails can be used. FIG. 3 shows a table saw 10 with a front extension rail 50 and a rear extension rail 52 coupled to the ends of front and rear rails 32 and 34, respectively, to increase the cutting capacity of the saw. An auxiliary extension table 54 extends between and is connected to the right ends of the front and rear extension rails to provide an additional support surface for work pieces. Front and rear extension rails 50 and 52 can be sized to provide significant additional cutting capacity. For example, the extension rails may be sized to provide 48 inches of cutting capacity to the right of the blade.

Figure 4:
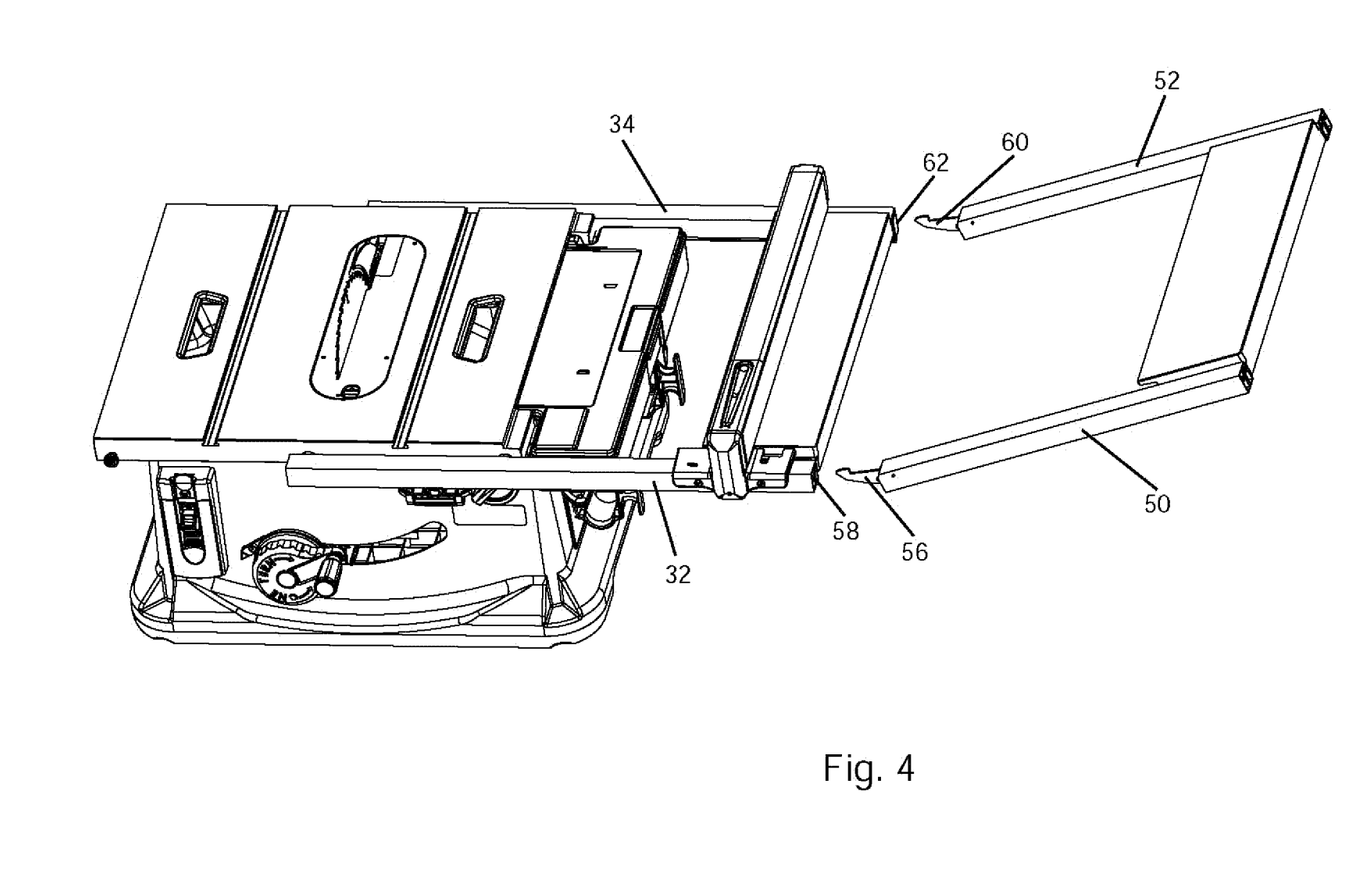
FIG. 4 shows a table saw and extension rails ready to be attached to the table saw.

Extension rails 50 and 52 may connect to front and rear rails 32 and 34 in various ways. FIG. 4 shows front extension rail 50 with a latch plate 56 extending out from the left end of the extension rail. Latch plate 56 is configured to fit in a socket 58 in the right end of front extension rail 32. Rear extension rail 52 has a similar latch plate 60, and rear rail 34 has a similar socket 62. A user simply inserts latch plates 56 and 60 into sockets 58 and 62 while holding the rails at somewhat of an angle, as shown generally in FIG. 4, and then lowers the rails until they are generally horizontal and in line with front and rear rails 32 and 34. Alternatively, one or both latch plates could extend from the front and rear rails, and one or both sockets could be positioned in the extension rails.

Figure 5:
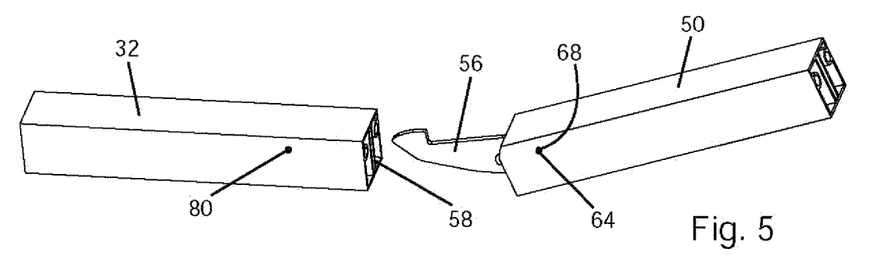
FIG. 5 shows a latch plate and socket associated with a rail and an extension rail.
Figure 6:
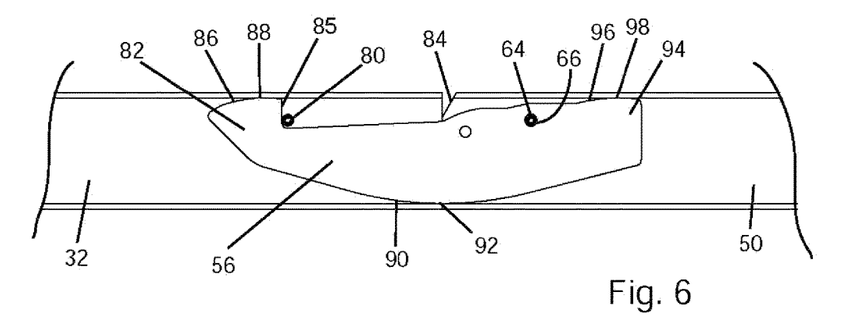
FIG. 6 shows a rail and extension rail coupled together by a latch plate and socket.

FIG. 5 shows an enlarged view of front extension rail 50 with latch plate 56 and front rail 32 with socket 58. FIG. 6 shows front rail 32 and front extension rail 50 joined together with latch plate 56 in socket 58. In FIG. 6, the rails are cut in cross-section so that latch plate 56 is visible.

Figure 7:
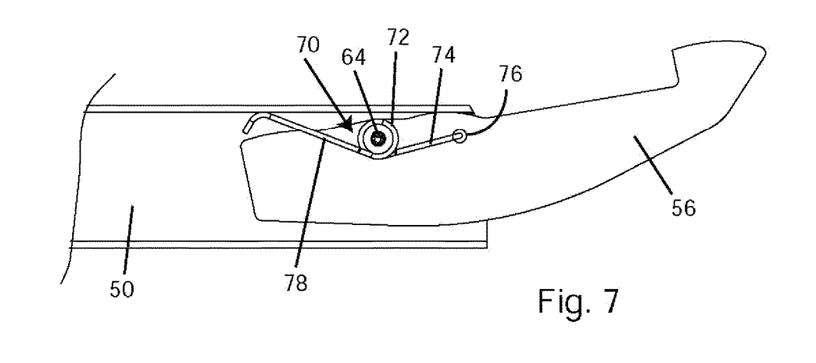
FIG. 7 shows a rail with a latch plate and spring.

Latch plate 56 is held in front extension rail 50 by a pin 64 that is pressed through a hole 66 in the latch plate, as shown in FIG. 6, and through holes in the rail, such as hole 68 shown in FIG. 5. Latch plate 56 can pivot around pin 64, and a spring 70 (shown in FIG. 7) biases the latch plate up. In FIG. 7, the rails are cut in cross-section so that latch plate 56 and spring 70 are visible. FIG. 7 shows the spring 70 adjacent what may be thought of as the back side of latch plate 56. Spring 70 includes a loop or coil portion 72 that extends over and around pin 64. A first spring arm 74 extends out from coil portion 72, and the tip of the first spring arm extends through a hole 76 in latch plate 56. A second spring arm 78 also extends out from coil portion 72 in a direction generally opposite the first spring arm, and the tip of the second spring arm rests against an inside top surface of front extension rail 50. In this manner spring 70 biases latch plate 56 up.

Front rail 32 includes a pin 80 that extends across the interior of the front rail. Pin 80 is pressed into holes in front rail 32 to secure the pin in place. Latch plate 56 hooks behind pin 80, as shown in FIG. 6, to connect front extension rail 50 to front rail 32. More specifically, latch plate 56 includes a distal end 82 sized and shaped to fit under pin 80. Distal end 82 also has a generally pointed shape to facilitate the insertion of the latch plate into socket 58. When front extension rail 50 is unconnected to front rail 32, distal end 82 extends above the top of the front extension rail, as shown in FIGS. 5 and 7. With this configuration, a user tilts the front extension rail relative to front rail 32 and inserts latch plate 56 into socket 58 so that distal end 82 passes beyond and under pin 80. The top edge of the end of the front extension rail adjacent latch plate 56 includes a cutout 84 (labeled in FIG. 6) that allows the front extension rail to tilt relative to front rail 32 as latch plate 56 is inserted into socket 58. Cutout 84 is sized so that the edge of the cutout contacts the end of front rail 32 when distal end 82 of latch plate 56 has passed under pin 80. Rear rail 34, rear extension rail 52, and rear latch plate 60 are configured similarly.

As stated previously, to connect the extension rails to the front and rear rails on the saw, a person holds the extension rails at an angle relative to the front and rear rails so that the distal ends of the latch plates fit into the respective sockets in the front and rear rails. The person then lowers the extension rails until they are in line with the front and rear rails. Gravity holds the extension rails down and hooks such as hook 85 prevent the extension rails from shifting horizontally to the right. A person reverses these steps to disconnect the extension rails, i.e., a user grasps the ends of the extension rails that are distal from the saw, pivots the extension rails up, and slides the latch plates out of the sockets to detach the extension rails from the table saw.

When front and rear extension rails 50 and 52 are attached to front and rear rails 32 and 34, respectively, the configuration of latch plates 56 and 60 transfers the weight of the extension rails to the main rails. When a person lowers the extension rails so that they are in line with the main rails, an upper edge 86 on the distal end 82 of latch plate 56 contacts the inside upper surface of front rail 32 at point 88, as shown in FIG. 6. That contact causes distal end 82 of latch plate 56 to pivot down around pin 64 against spring 70. Latch plate 56 is configured so that when distal end 82 pivots down, a bottom edge 90 of latch plate 56 contacts the inside bottom surface of front rail 32 and front extension rail 52 at point 92 generally over the joint between the main and extension rails, as shown in FIG. 6. At the same time, rear end 94 of latch plate 56 pivots up around pin 64 until a rear upper edge 96 contacts the inside upper surface of extension rail 50 at point 98. These three contact points—88, 90 and 98—stabilize the front extension rail relative to the front rail and transfer the weight of the front extension rail to the front rail. Gravity pulls the extension rails down and holds the rails in place. Additionally, pins 64 and 80 may flex slightly when front extension rail 50 is lowered into place, and the flexing of the pins provides at least some moderate force to help hold the rails together. The rear rail is secured and supported similarly.

Figure 8:
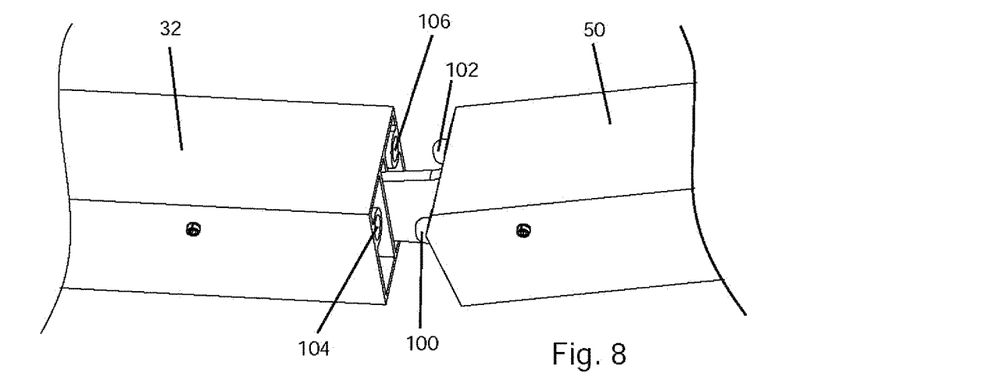
FIG. 8 shows a rail and a rail extension with ball and socket guides.
Figure 9:
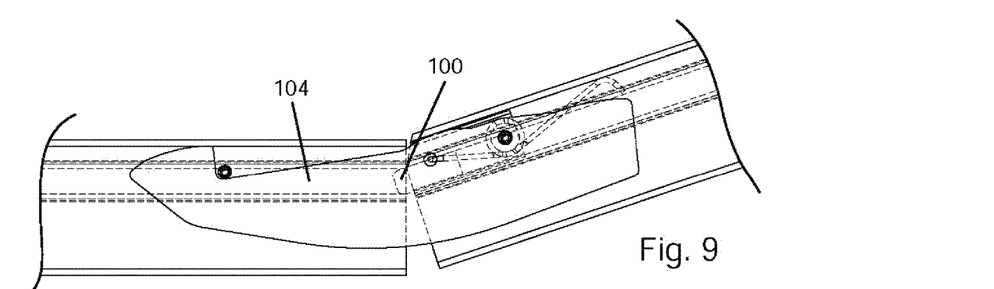
FIG. 9 shows a rail and a rail extension, with the rail extension at an angle relative to the rail, and with a ball entering a socket.
Figure 10:
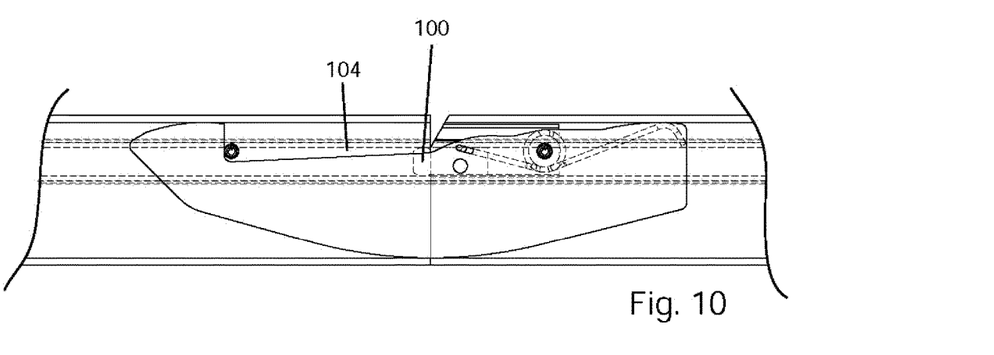
FIG. 10 shows a rail and a rail extension, with the rail and rail extension collinear and with a ball in a socket.

FIGS. 8, 9 and 10 show ball and socket pairs that can be used to provide front-to-back and rotational alignment of the rails, and they can also contribute to vertical alignment. Balls 100 and 102 in front extension rail 50 are configured to fit into sockets 104 and 106, respectively, in front rail 32. Balls 100 and 102 can be press fit into channels or sockets in the extension rail. Of course, other means could be implemented to provide the front-to-back and rotational alignment of the rails, and guides of various shapes could be used in place of balls 100 and 102.

Front and rear rails 32 and 34 may be extruded with the sockets and surfaces described above. Front extension rail 50 and rear extension rail 52 are sized to provide 48 inches of cutting capacity to the right of the blade with the fence being used.

Extension rails configured as described above are quickly attachable to and detachable from a table saw without having to manipulate knobs and/or levers. A user can also attach and detach the extension rails without having to be within reach of the joint between the main rails and the extension rails.

Figure 11:
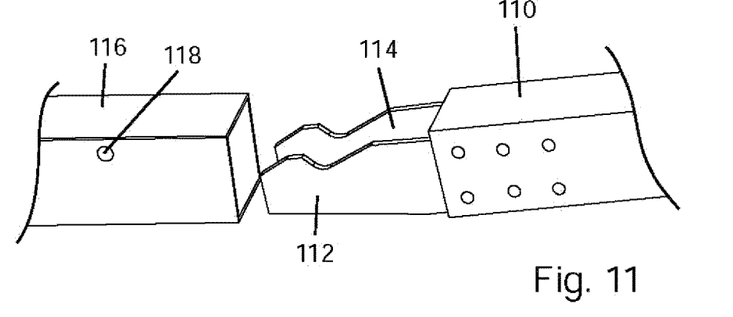
FIG. 11 shows an alternative embodiment with two latch plates extending from an extension rail.
Figure 12:
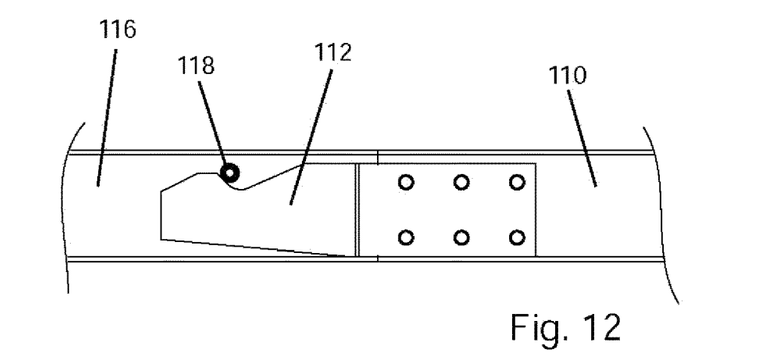
FIG. 12 shows the embodiment of FIG. 11 with the latch plates inserted into a rail.

FIGS. 11 and 12 show an alternative embodiment where an extension rail 110 includes two latch plates 112 and 114 attached to and extending out from the extension rail. Latch plates 112 and 114 are configured to extend into a hollow main rail 116 and hook behind a pin or bolt 118 extending across main rail 116.

Figure 13:
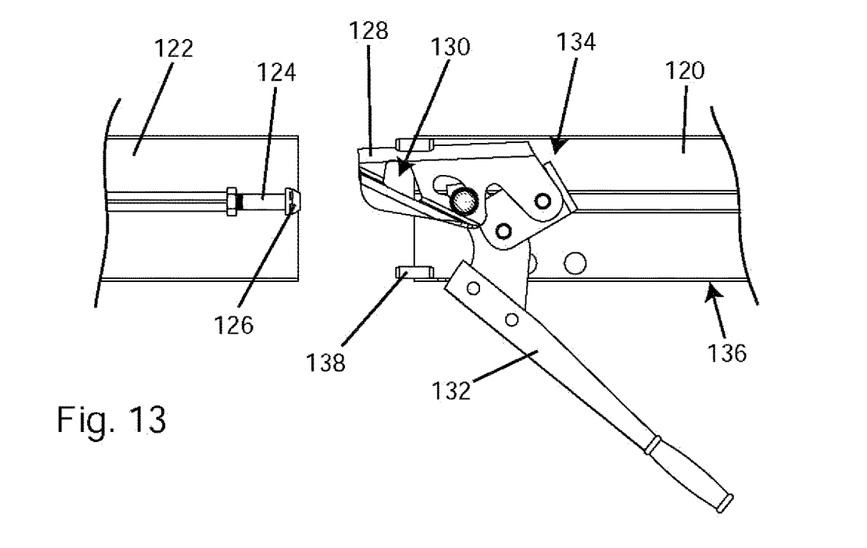
FIG. 13 shows an alternative embodiment with a clamping mechanism configured to secure a rail and extension rail together.

FIG. 13 shows an alternative embodiment where a clamping mechanism holds an extension rail 120 to a main rail 122. An anchor 124 is attached to main rail 122, and the anchor includes a flange or head 126. A clamp plate 128 is mounted in extension rail 120, and the clamp plate includes cutouts, such as cutout 130, configured to move over and fit around head 126 on anchor 124. A lever 132 is linked to clamp plate 130 via a linkage 134 so that movement of the lever causes clamp plate 128 and cutout 130 to move over head 126 so that head 126 will catch on one or more edges of cutout 130. Continued movement of the lever pulls or clamps extension rail 120 and main rail 122 together by cutout 130 catching on head 126. Extension rail 120 includes a recess or cutout 136 to receive lever 132. Guide pins can be used to align the rails, such as guide pin 138. A clamping mechanism of this type can provide significant force to hold the rails together, for example, 1,000 pounds or more.

INDUSTRIAL APPLICABILITY

The extension rails described herein are applicable to table saws and other power tools for woodworking, manufacturing, packaging, construction, carpentry, material processing, etc.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, the recitation of "a" or "a first" element, or the equivalent thereof, should be understood to include incorporation of one or more such elements, neither requiring nor excluding two or more such elements.

It is believed that the following claims particularly point out certain combinations and sub-combinations that are directed to disclosed inventions. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A table saw comprising:
 a table having a work surface,
 a fence,
 a front rail associated with the table to support the fence, where the front rail has an end,
 a front rail extension, where the front rail extension has an end,
 a latch plate extending from either the end of the front rail or the end of the front rail extension,
 a socket in the end of the front rail or in the end of the front rail extension, whichever the latch plate does not extend from, where the socket is configured to receive at least a portion of the latch plate, and
 a pin associated with the socket,
 where the front rail extension is configured to connect to the front rail by the latch plate being inserted into the socket with at least a portion of the front rail extension at an angle above the front rail and above the work surface, and then the front rail extension being lowered to be in line with the front rail and substantially parallel with the work surface, which lowering causes the latch plate to hook around the pin, and
 where the front rail extension is configured to be disconnected from the front rail by at least a portion of the front rail extension being raised to be out of line with the front rail and above the work surface, wherein the raising of the front rail extension causes the latch plate to cease to hook around the pin, and then the latch plate being removed from the socket with at least a portion of the front rail extension at an angle above the front rail.

2. The table saw of claim 1, where the latch plate extends from the front rail extension.

3. The table saw of claim 1, where gravity contributes to holding the latch plate around the pin.

4. The table saw of claim 1, further comprising a pin associated with the latch plate, where the latch plate is configured to pivot around the pin.

\* \* \* \* \*